(12) United States Patent
Daloukov et al.

(10) Patent No.: US 10,180,779 B2
(45) Date of Patent: Jan. 15, 2019

(54) METHOD FOR DYNAMICALLY PRESENTING STATUS INFORMATION OF A MONITORED SYSTEM WITHIN A GRAPHICAL USER INTERFACE

(71) Applicant: VMware, Inc., Palo Alto, CA (US)

(72) Inventors: George Daloukov, San Francisco, CA (US); Nikki Roda, San Francisco, CA (US); Ramona Sharples, San Francisco, CA (US); Danny Walcoff, San Francisco, CA (US)

(73) Assignee: VMware, Inc., Palo Alto, CA (US)

( * ) Notice: Subject to any disclaimer, the term of this patent is extended or adjusted under 35 U.S.C. 154(b) by 225 days.

(21) Appl. No.: 15/060,444

(22) Filed: Mar. 3, 2016

(65) Prior Publication Data
US 2017/0255363 A1    Sep. 7, 2017

(51) Int. Cl.
*G06F 17/20*     (2006.01)
*G06F 3/0484*    (2013.01)
*G06T 11/00*     (2006.01)

(52) U.S. Cl.
CPC ...... *G06F 3/04842* (2013.01); *G06F 3/04847* (2013.01); *G06T 11/001* (2013.01); *G06T 2200/24* (2013.01)

(58) Field of Classification Search
CPC ...... G06F 3/048–3/04897; H04L 41/20; H04L 41/22
See application file for complete search history.

(56) References Cited

U.S. PATENT DOCUMENTS

| | | | | |
|---|---|---|---|---|
| 8,725,860 | B1* | 5/2014 | Voltmer | H04L 41/50 709/220 |
| 2014/0143695 | A1* | 5/2014 | Sundermeyer | H04L 41/22 715/765 |
| 2015/0188786 | A1* | 7/2015 | Burns | G06Q 10/10 709/224 |
| 2016/0057034 | A1* | 2/2016 | Rosier | H04L 41/0883 709/224 |

* cited by examiner

*Primary Examiner* — Keith D Bloomquist
(74) *Attorney, Agent, or Firm* — Clayton, McKay & Bailey, PC

(57) ABSTRACT

In a computer-implemented method for dynamically presenting status information of a monitored system within a graphical user interface, a first view is displayed within the graphical user interface, the first view including a textual representation indicative of a status of a monitored system, the textual representation including at least one interactive portion that is user-selectable for presenting underlying information associated with the interactive portion. Responsive to a user selection, a second view is displayed within the graphical user interface, the second view including a plurality of status boxes representative of monitored attributes of the monitored system. A particular status box of the plurality of status boxes is selectively promoted to the first view in response to the detection of a particular condition based on the monitored attributes. A particular interactive portion associated with the particular status box is integrated into the textual representation.

20 Claims, 13 Drawing Sheets

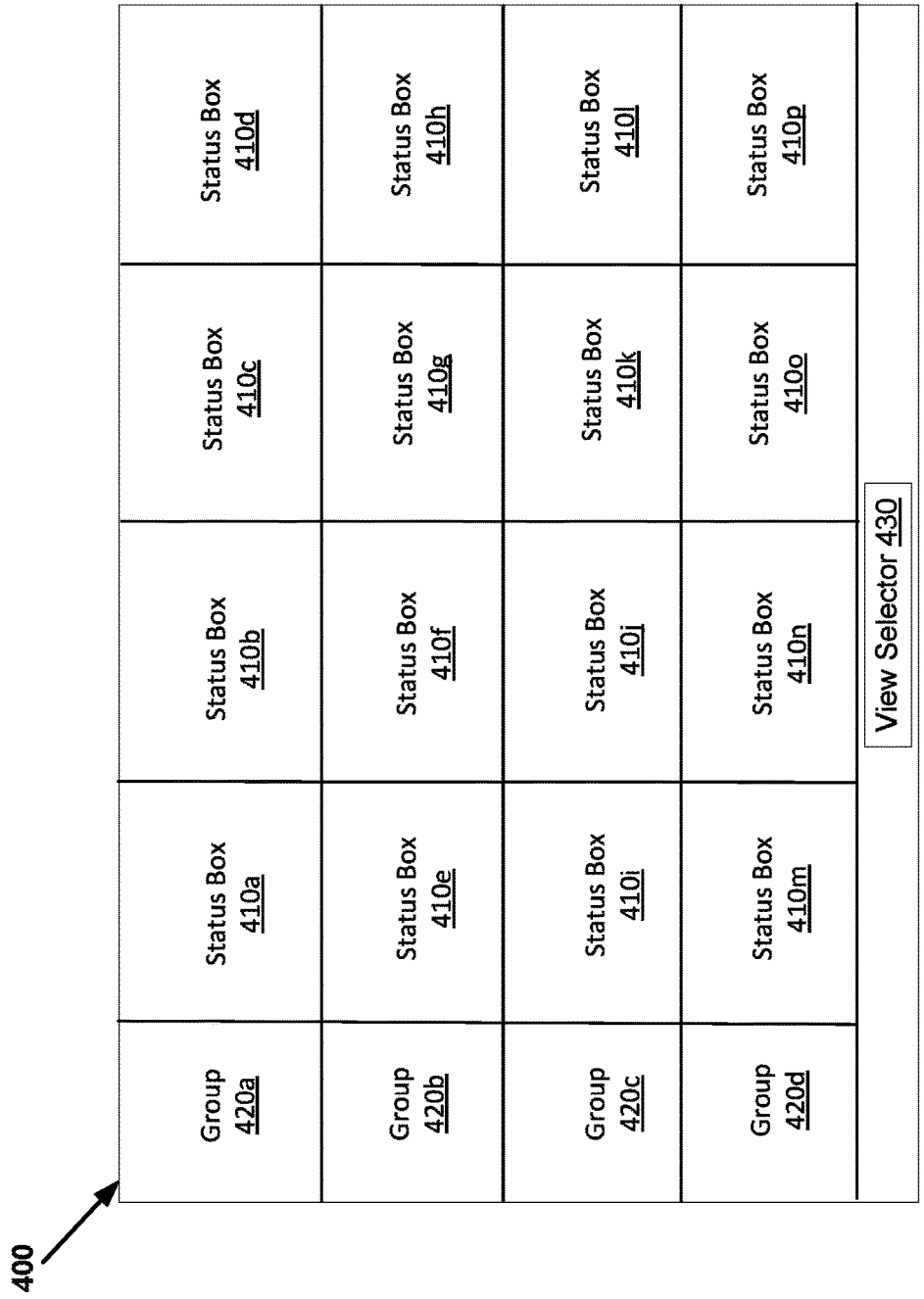

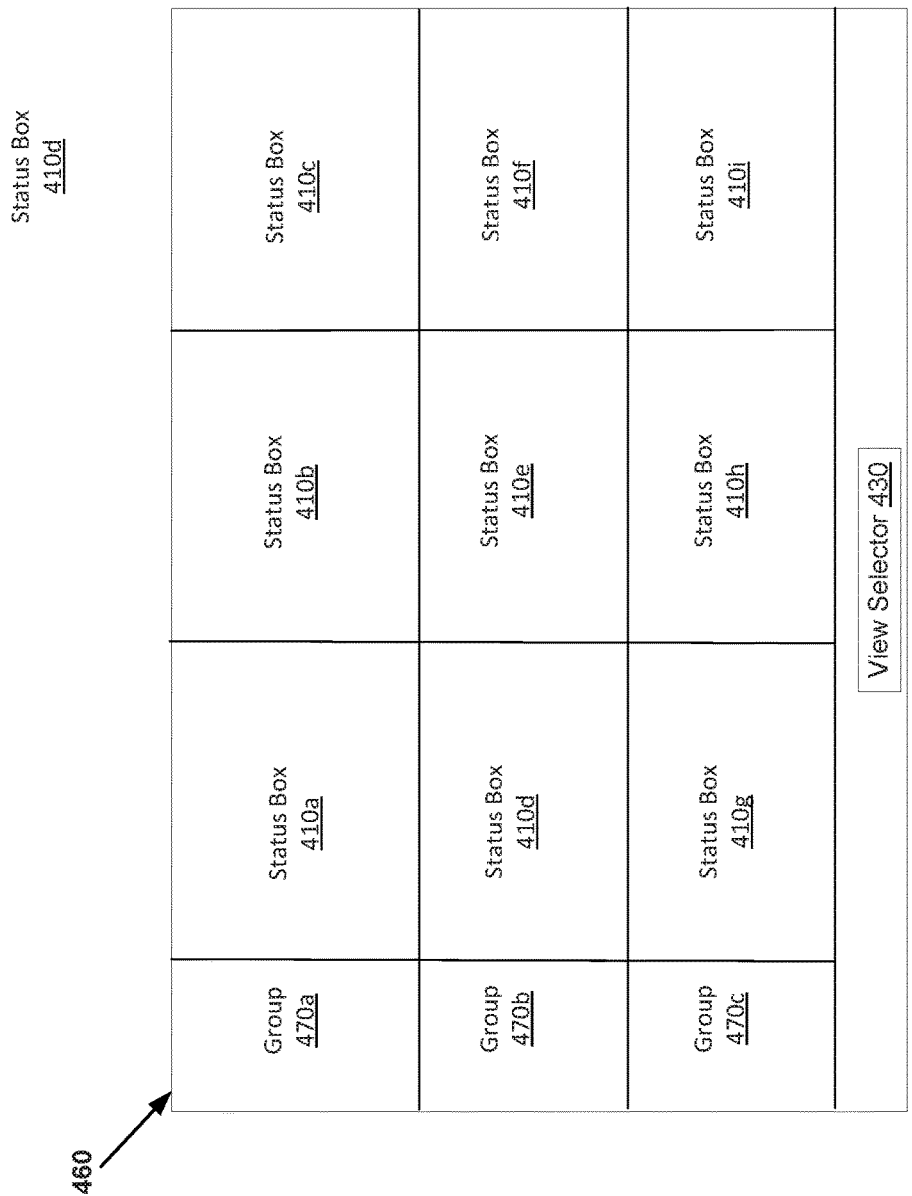

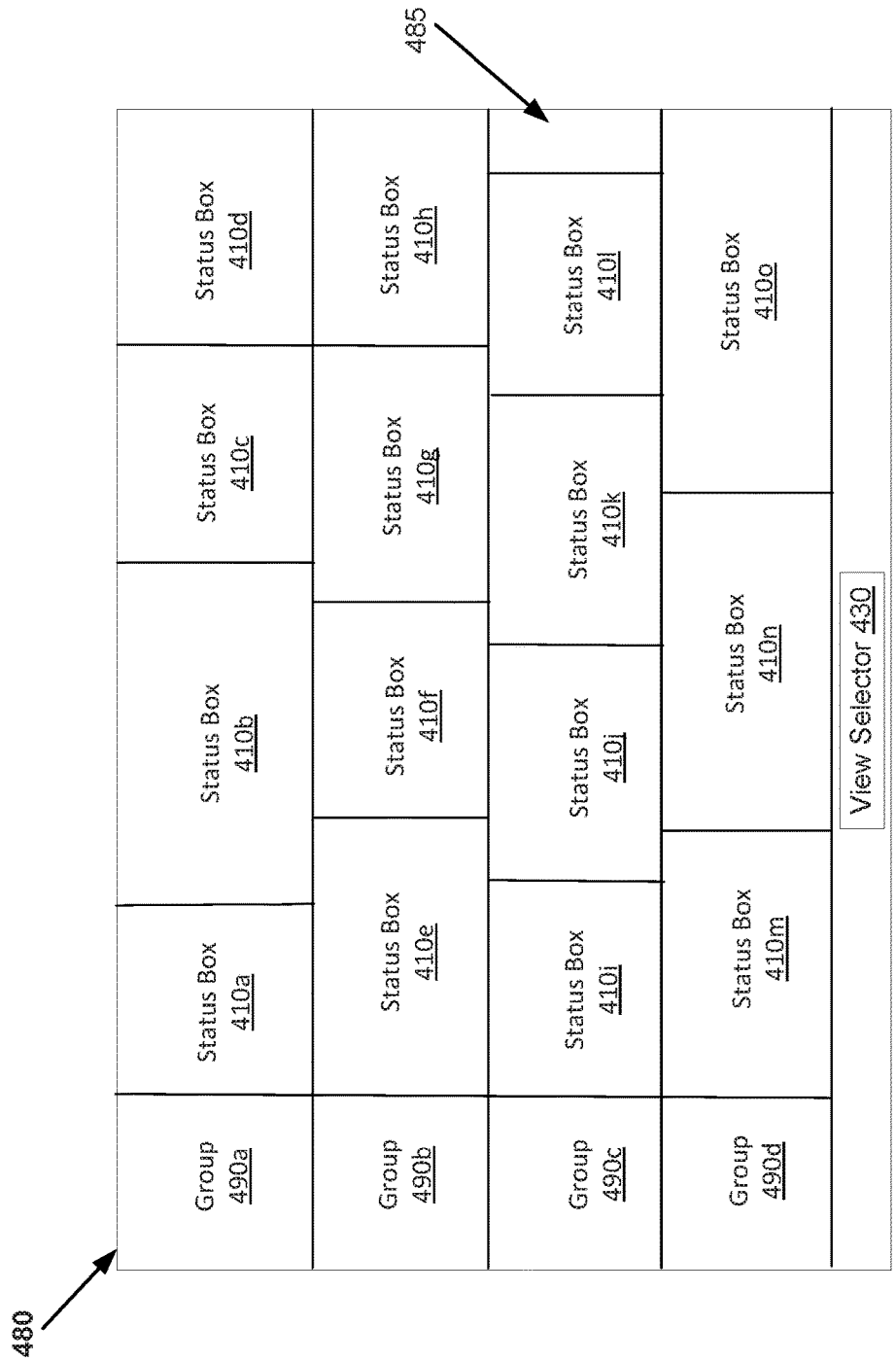

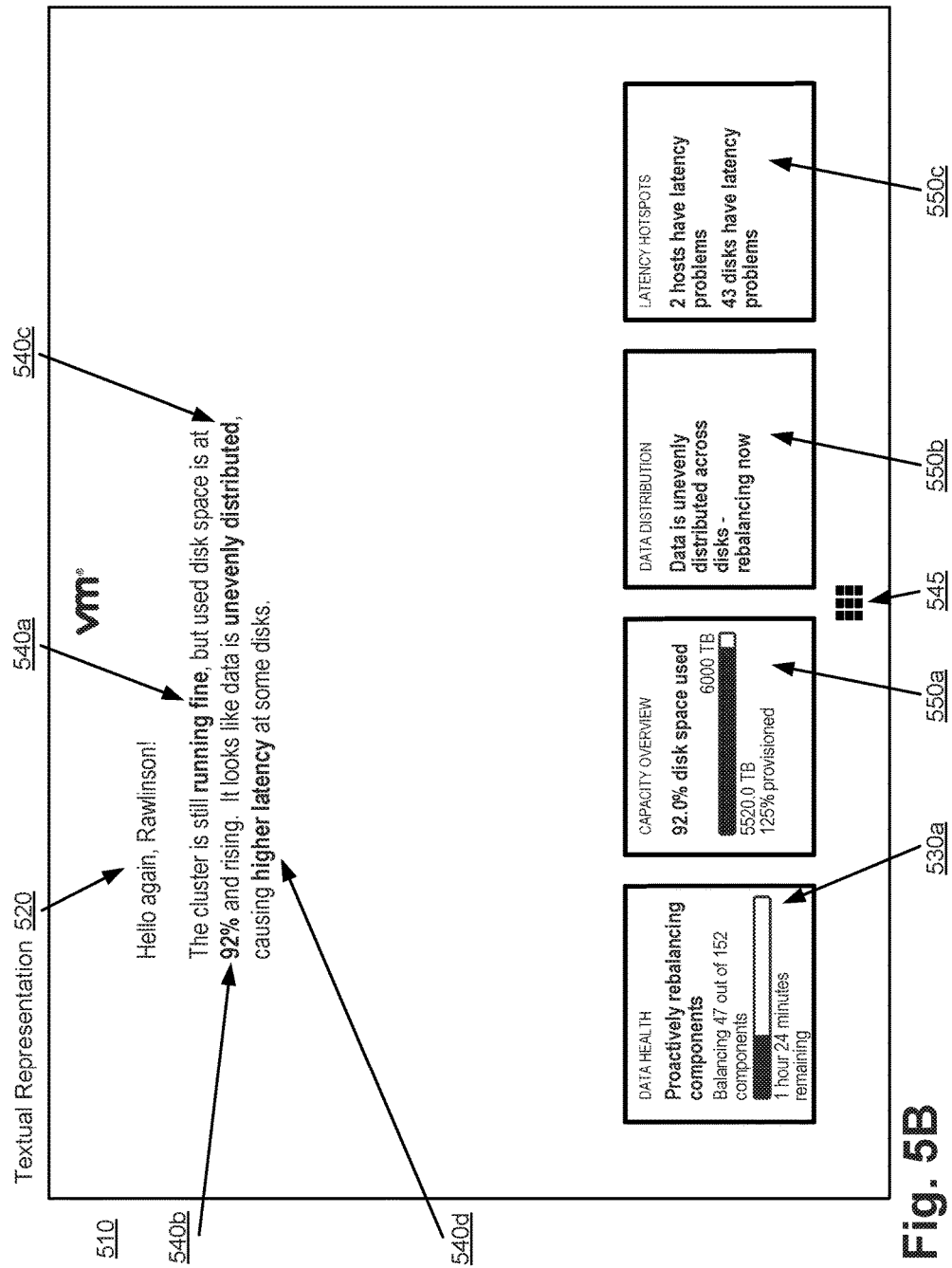

600

```
┌─────────────────────────────────────────────────────────┐
│ DISPLAY A FIRST VIEW WITHIN THE GRAPHICAL USER          │
│ INTERFACE, THE FIRST VIEW COMPRISING A TEXTUAL          │
│ REPRESENTATION INDICATIVE OF A STATUS OF A MONITORED    │
│ SYSTEM, THE TEXTUAL REPRESENTATION COMPRISING AT        │
│ LEAST ONE INTERACTIVE PORTION THAT IS USER-SELECTABLE   │
│ FOR PRESENTING UNDERLYING INFORMATION ASSOCIATED        │
│ WITH THE INTERACTIVE PORTION.                           │
│ 610                                                     │
└─────────────────────────────────────────────────────────┘
                            │
                            ▼
┌─────────────────────────────────────────────────────────┐
│ DISPLAY, RESPONSIVE TO A USER SELECTION, A SECOND VIEW  │
│ WITHIN THE GRAPHICAL USER INTERFACE, THE SECOND VIEW    │
│ COMPRISING A PLURALITY OF STATUS BOXES REPRESENTATIVE   │
│ OF MONITORED ATTRIBUTES OF THE MONITORED SYSTEM.        │
│ 620                                                     │
└─────────────────────────────────────────────────────────┘
                            │
                            ▼
┌─────────────────────────────────────────────────────────┐
│ AUTOMATICALLY MONITOR THE MONITORED ATTRIBUTES OF       │
│ THE PLURALITY OF STATUS BOXES FOR DETECTION OF AT       │
│ LEAST ONE PARTICULAR CONDITION.                         │
│ 630                                                     │
└─────────────────────────────────────────────────────────┘
                            │
                            ▼
┌─────────────────────────────────────────────────────────┐
│ SELECTIVELY PROMOTE A PARTICULAR STATUS BOX OF THE      │
│ PLURALITY OF STATUS BOXES TO THE FIRST VIEW IN RESPONSE │
│ TO THE DETECTION OF A PARTICULAR CONDITION BASED ON     │
│ THE MONITORED ATTRIBUTES.                               │
│ 640                                                     │
└─────────────────────────────────────────────────────────┘
                            │
                            ▼
┌─────────────────────────────────────────────────────────┐
│ INTEGRATE A PARTICULAR INTERACTIVE PORTION ASSOCIATED   │
│ WITH THE PARTICULAR STATUS BOX INTO THE TEXTUAL         │
│ REPRESENTATION.                                         │
│ 650                                                     │
└─────────────────────────────────────────────────────────┘
                            │
                            ▼
                          ( A )
```

RESPONSIVE TO A USER INTERACTION WITH AN INTERACTIVE PORTION OF THE TEXTUAL REPRESENTATION, EMPHASIZE AT LEAST ONE STATUS BOX WITHIN THE FIRST VIEW ASSOCIATED WITH THE INTERACTIVE PORTION.
660

600

RESPONSIVE TO A USER INTERACTION WITH A STATUS BOX WITHIN THE FIRST VIEW, DISPLAY THE SECOND VIEW.
662

EMPHASIZE THE STATUS BOX WITHIN THE SECOND VIEW.
664

600

RESPONSIVE TO A USER INTERACTION WITH A STATUS BOX PRESENT A DETAILED VIEW PROVIDING ADDITIONAL INFORMATION RELATED TO THE SELECTED STATUS BOX.
672

METHOD FOR DYNAMICALLY PRESENTING STATUS INFORMATION OF A MONITORED SYSTEM WITHIN A GRAPHICAL USER INTERFACE

BACKGROUND

As the size of monitored systems, such as enterprise networks, management information systems, virtualized infrastructures, virtual storage area networks (VSAN), etc. grow, the management of such systems grows increasingly complex. Many tools are currently available for aiding in the management of such systems, but often suffer from various shortcomings. For example, many management tools provide dashboards that attempt to present information needed to manage such systems. However, dashboards often include more information than is necessary, obfuscating the pertinent or relevant data. This is increasingly important in the event of an error or system malfunction, when the cause or root of the problem may be hidden from the administrator's view due to the overwhelming amount of information presented.

BRIEF DESCRIPTION OF DRAWINGS

The accompanying drawings, which are incorporated in and form a part of the Description of Embodiments, illustrate various embodiments of the subject matter and, together with the Description of Embodiments, serve to explain principles of the subject matter discussed below. Unless specifically noted, the drawings referred to in this Brief Description of Drawings should be understood as not being drawn to scale. Herein, like items are labeled with like item numbers.

FIGS. 4A-D show example second views of a graphical user interface, in accordance with various embodiments.

FIGS. 5A-C an example graphical user interface, in accordance with various embodiments.

FIGS. 6A-D illustrate flow diagrams of examples for dynamically presenting status information of a monitored system within a graphical user interface, according to various embodiments.

DESCRIPTION OF EMBODIMENTS

Figure 1:
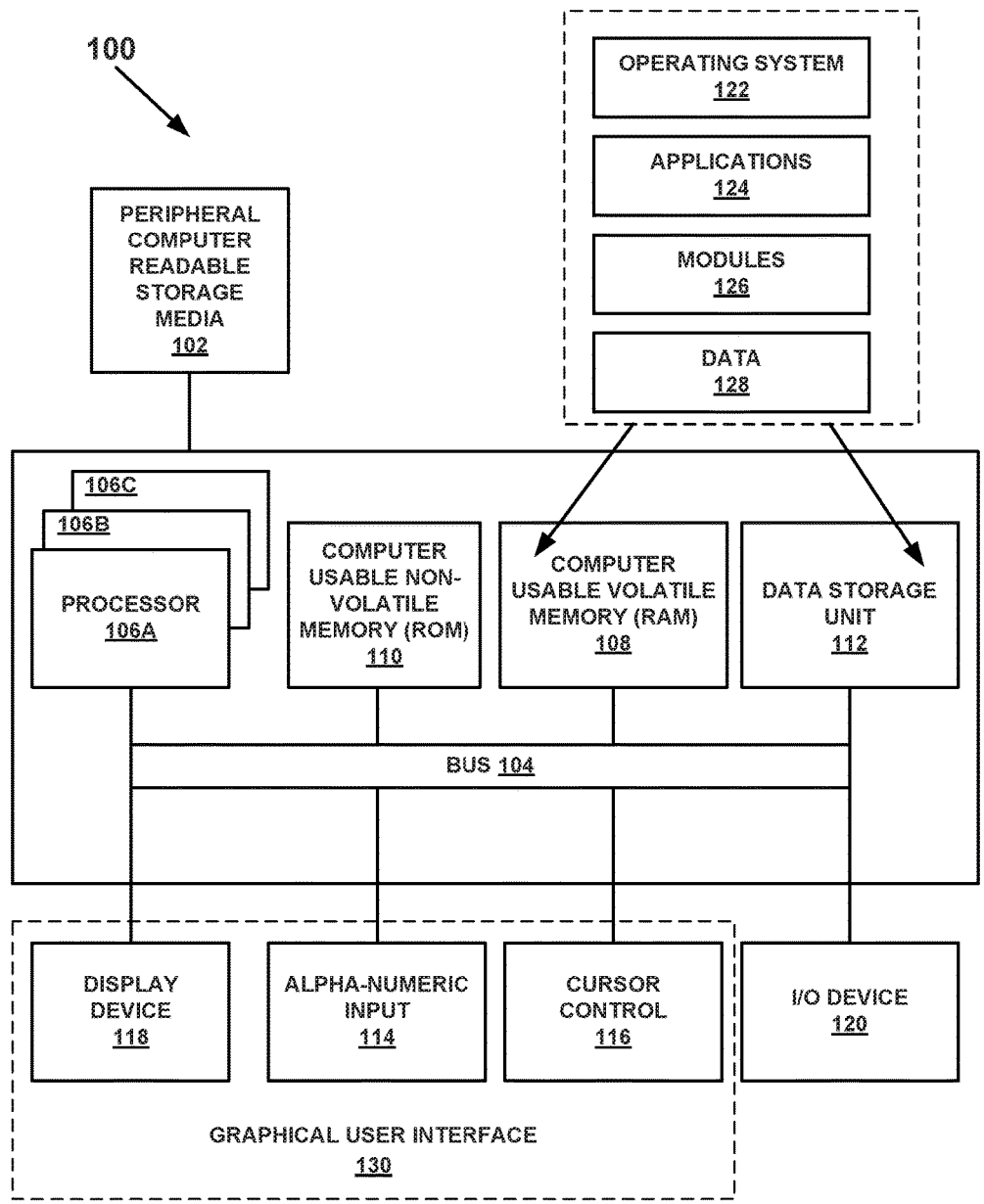
FIG. 1 shows an example computer system upon which embodiments of the present invention can be implemented.

Reference will now be made in detail to various embodiments of the subject matter, examples of which are illustrated in the accompanying drawings. While various embodiments are discussed herein, it will be understood that they are not intended to limit to these embodiments. On the contrary, the presented embodiments are intended to cover alternatives, modifications and equivalents, which may be included within the spirit and scope the various embodiments as defined by the appended claims. Furthermore, in this Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

Notation and Nomenclature

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be one or more self-consistent procedures or instructions leading to a desired result. The procedures are those requiring physical manipulations of physical quantities. Usually, although not necessarily, these quantities take the form of electrical or magnetic signals capable of being stored, transferred, combined, compared, and otherwise manipulated in an electronic device.

It should be borne in mind, however, that all of these and similar terms are to be associated with the appropriate physical quantities and are merely convenient labels applied to these quantities. Unless specifically stated otherwise as apparent from the following discussions, it is appreciated that throughout the description of embodiments, discussions utilizing terms such as "displaying," "promoting," "integrating," "emphasizing," "providing," "monitoring," "determining," or the like, refer to the actions and processes of an electronic computing device or system such as: a host processor, a processor, a memory, a virtual storage area network (VSAN), a virtualization management server or a virtual machine (VM), among others, of a virtualization infrastructure or a computer system of a distributed computing system, or the like, or a combination thereof. The electronic device manipulates and transforms data represented as physical (electronic and/or magnetic) quantities within the electronic device's registers and memories into other data similarly represented as physical quantities within the electronic device's memories or registers or other such information storage, transmission, processing, or display components.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example mobile electronic device described herein may include components other than those shown, including well-known components.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, perform one or more of the methods described herein. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors, such as one or more motion processing units (MPUs), sensor processing units (SPUs), host processor(s) or core(s) thereof, digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an SPU/MPU and a microprocessor, a plurality of microprocessors, one or more microprocessors in conjunction with an SPU core, MPU core, or any other such configuration.

Overview of Discussion

Example embodiments described herein improve the management of monitored systems, such a virtualized infrastructures and virtual storage area networks (VSANs). In a computer-implemented method for dynamically presenting status information of a monitored system within a graphical user interface (GUI), a first view is displayed within the GUI, where the first view including a textual representation indicative of a status of a monitored system. The textual representation includes at least one interactive portion that is user-selectable for presenting underlying information associated with the interactive portion. In one embodiment, the textual representation includes a narrative description of the status of the monitored system. Responsive to a user selection, a second view is displayed within the GUI, the second view including a plurality of status boxes representative of monitored attributes of the monitored system. A particular status box of the plurality of status boxes is selectively promoted to the first view in response to the detection of a particular condition based on the monitored attributes. A particular interactive portion associated with the particular status box is integrated into the textual representation.

It should be appreciated that the type of information that is important for administrators of a monitored system depends on the type of monitored system. For example, the information that is important to administrators of a virtualized environment might be different that the information important to administrators of a VSAN. Using the example of monitoring a VSAN, there are many complicated metrics involved in monitoring a storage system, and many of them do not have universally optimal ranges. For instance, it is difficult to pass a judgment on the current throughput of a system (the amount of data flowing through it) without knowledge on throughput capacity, typical throughput for the existing hardware, and what kinds of workloads are currently running. An administrator experienced in reading these kinds of metrics can glance at them, use existing knowledge of what is normal for the environment, and quickly get a feel for how the monitored system is performing.

However, for a less sophisticated or experienced user, it would be useful to provide such users with a higher level health indicator of a monitored system in a GUI. Moreover, as the size of such monitored systems grows the complexity of the monitored system also grows, and the amount of information available for monitoring grows as well. When virtualized systems are considered, such as virtualized environments and VSANs, the abstraction between hardware resources and virtual resources also adds an additional layer of complexity. Accordingly, a user interface that dynamically presents information in a multi-level dashboard, where the most important information is most readily presented, would be very useful to the administration of such monitored systems.

Embodiments described herein provide a multi-level dashboard within a GUI, wherein a series of linked dashboard provide different levels of information, where each level includes a summary of the underlying information. Moreover, embodiments described herein provide for the selective promotion of the underlying information to a higher level dashboard responsive to the detection (or lack of detection) of particular operating conditions. In various embodiments, the underlying information (e.g., information presented in a status box) may allow for corrective actions to be initiated in response to the detection of a particular condition (e.g., an error condition).

In accordance with various embodiments, the high level view of the multi-level dashboard includes a textual representation that provides information indicative of a status of a monitored system. In one embodiment, the textual representation includes a narrative description of the status of the monitored system. For example, the textual representation may include a character string, a word, a phrase, a sentence or a plurality of sentences that provide a narrative description of the status of the monitored system. Moreover, in various embodiments, at least one portion of the textual representation (e.g., a character string, a word, a phrase or a sentence) is interactive for presenting underlying information associated with the portion of the textual representation. For example, the high level view (e.g., first view) might include two status boxes representative of various metrics of the monitored system and a textual representation that summarizes the overall health of the monitored system. Two portions of the textual representation (e.g., character strings, words or phrases) are interactive and, when interacted with, indicate the appropriate status box corresponding to the interactive portion. It should be appreciated that, in various embodiments, a textual representation does not include any interactive portions.

As the size and complexity of monitored systems grows, so grows the management complexity of such systems. Currently available dashboards typically provide an overabundance of information that may only be interpreted by sophisticated and experience administrators. Accordingly, the embodiments provided herein improve the performance of dashboards for monitored systems by summarizing the overall status of the monitored system and selectively promoting the most relevant status information to a first view, allowing an administrator to most effectively manage such systems and to improve triage management of detected conditions.

Example Computer System Environment

With reference now to FIG. 1, all or portions of some embodiments described herein are composed of computer-readable and computer-executable instructions that reside, for example, in computer-usable/computer-readable storage media of a computer system. That is, FIG. 1 illustrates one example of a type of computer (computer system 100) that can be used in accordance with or to implement various embodiments which are discussed herein. It is appreciated that computer system 100 of FIG. 1 is only an example and that embodiments as described herein can operate on or within a number of different computer systems including, but not limited to, general purpose networked computer systems, embedded computer systems, routers, switches, server devices, client devices, various intermediate devices/nodes, stand alone computer systems, media centers, handheld computer systems, multi-media devices, virtual machines, virtualization management servers, and the like. Computer system 100 of FIG. 1 is well adapted to having peripheral tangible computer-readable storage media 102 such as, for example, an electronic flash memory data storage device, a floppy disc, a compact disc, digital versatile disc, other disc based storage, universal serial bus "thumb" drive, removable memory card, and the like coupled thereto. The tangible computer-readable storage media is non-transitory in nature.

System 100 of FIG. 1 includes an address/data bus 104 for communicating information, and a processor 106A coupled with bus 104 for processing information and instructions. As depicted in FIG. 1, system 100 is also well suited to a multi-processor environment in which a plurality of processors 106A, 106B, and 106C are present. Conversely, system 100 is also well suited to having a single processor such as, for example, processor 106A. Processors 106A, 106B, and 106C may be any of various types of microprocessors. System 100 also includes data storage features such as a computer usable volatile memory 108, e.g., random access memory (RAM), coupled with bus 104 for storing information and instructions for processors 106A, 106B, and 106C. System 100 also includes computer usable non-volatile memory 110, e.g., read only memory (ROM), coupled with bus 104 for storing static information and instructions for processors 106A, 106B, and 106C. Also present in system 100 is a data storage unit 112 (e.g., a magnetic or optical disc and disc drive) coupled with bus 104 for storing information and instructions. System 100 also includes an alphanumeric input device 114 including alphanumeric and function keys coupled with bus 104 for communicating information and command selections to processor 106A or processors 106A, 106B, and 106C. System 100 also includes an cursor control device 116 coupled with bus 104 for communicating user input information and command selections to processor 106A or processors 106A, 106B, and 106C. In one embodiment, system 100 also includes a display device 118 coupled with bus 104 for displaying information.

Referring still to FIG. 1, display device 118 of FIG. 1 may be a liquid crystal device (LCD), light emitting diode display (LED) device, cathode ray tube (CRT), plasma display device, a touch screen device, or other display device suitable for creating graphic images and alphanumeric characters recognizable to a user. Cursor control device 116 allows the computer user to dynamically signal the movement of a visible symbol (cursor) on a display screen of display device 118 and indicate user selections of selectable items displayed on display device 118. Many implementations of cursor control device 116 are known in the art including a trackball, mouse, touch pad, touch screen, joystick or special keys on alphanumeric input device 114 capable of signaling movement of a given direction or manner of displacement. Alternatively, it will be appreciated that a cursor can be directed and/or activated via input from alphanumeric input device 114 using special keys and key sequence commands. System 100 is also well suited to having a cursor directed by other means such as, for example, voice commands. In various embodiments, alphanumeric input device 114, cursor control device 116, and display device 118, or any combination thereof (e.g., user interface selection devices), may collectively operate to provide a graphical user interface (GUI) 130 under the direction of a processor (e.g., processor 106A or processors 106A, 106B, and 106C). GUI 130 allows user to interact with system 100 through graphical representations presented on display device 118 by interacting with alpha-numeric input device 114 and/or cursor control device 116.

System 100 also includes an I/O device 120 for coupling system 100 with external entities. For example, in one embodiment, I/O device 120 is a modem for enabling wired or wireless communications between system 100 and an external network such as, but not limited to, the Internet.

Referring still to FIG. 1, various other components are depicted for system 100. Specifically, when present, an operating system 122, applications 124, modules 126, and data 128 are shown as typically residing in one or some combination of computer usable volatile memory 108 (e.g., RAM), computer usable non-volatile memory 110 (e.g., ROM), and data storage unit 112. In some embodiments, all or portions of various embodiments described herein are stored, for example, as an application 124 and/or module 126 in memory locations within RAM 108, computer-readable storage media within data storage unit 112, peripheral computer-readable storage media 102, and/or other tangible computer-readable storage media.

Figure 2:
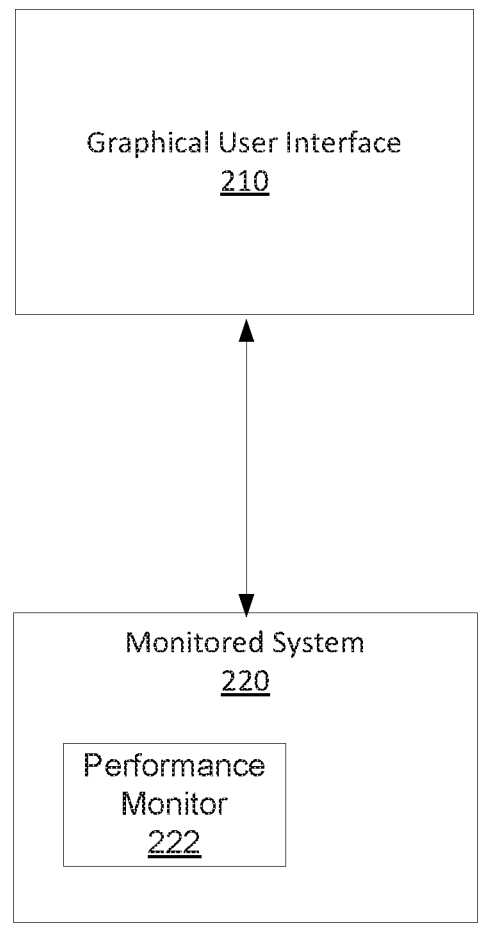
FIG. 2 shows an example monitored system and graphical user interface, in accordance with various embodiments.

Example Graphical User Interface for Dynamically Presenting Status Information of a Monitored System Example embodiments described herein provide a GUI for dynamically presenting status information of a monitored system. With reference now to FIG. 2, an example monitored system 220 and graphical user interface 210 are shown, in accordance with various embodiments. It should be appreciated that that monitored system 220 can be any type of system that is monitored, such VSANs, virtualized infrastructures, enterprise networks, management information systems, etc.

In one embodiment, monitored system 220 includes performance monitor 222. It should be appreciated that the operations of performance monitor might be distributed across monitored system 220, or might be performed by multiple components or monitors of monitored system 220. For purposes of simplicity, performance monitor 222 refers to all health and performance monitoring performed within monitored system 220, including the collection of raw data, the calculation of performance metrics or health metrics, and all operations related to monitoring performance of monitored system 220.

In one embodiment, monitored system 220 is a VSAN. A VSAN uses hyper-converged storage architecture, enabling compute and storage resources to be delivered through common a virtualized platform. A VSAN can be architected using a variety of hardware and software implementations. For example, a VSAN can be architected as hybrid-storage or all-flash storage. In hybrid storage architecture, a VSAN pulls magnetic discs and flash drives into servers to create distributed shared data stores where the flash storage provides caching to accelerate performance and magnetic discs store data. In all-flash architecture, flash storage provides both caching and data persistence.

As a VSAN includes both software and hardware components, and utilizes virtualization to provide storage, there is typically a large amount of data that can be captured for monitoring. For example, management of a VSAN requires monitoring and awareness of the VSAN health, capacity, performance, and environment. Example VSAN health information includes, data health, infrastructure health, network health, and input/output operations per second (IOPS). Example capacity information includes data efficiency, data distribution, and usage predictions. Example performance information includes IOPS, throughput, latency and latency hotspots. Example environment information includes VM overview, host overview, version usage, and enabled features.

Figure 3:
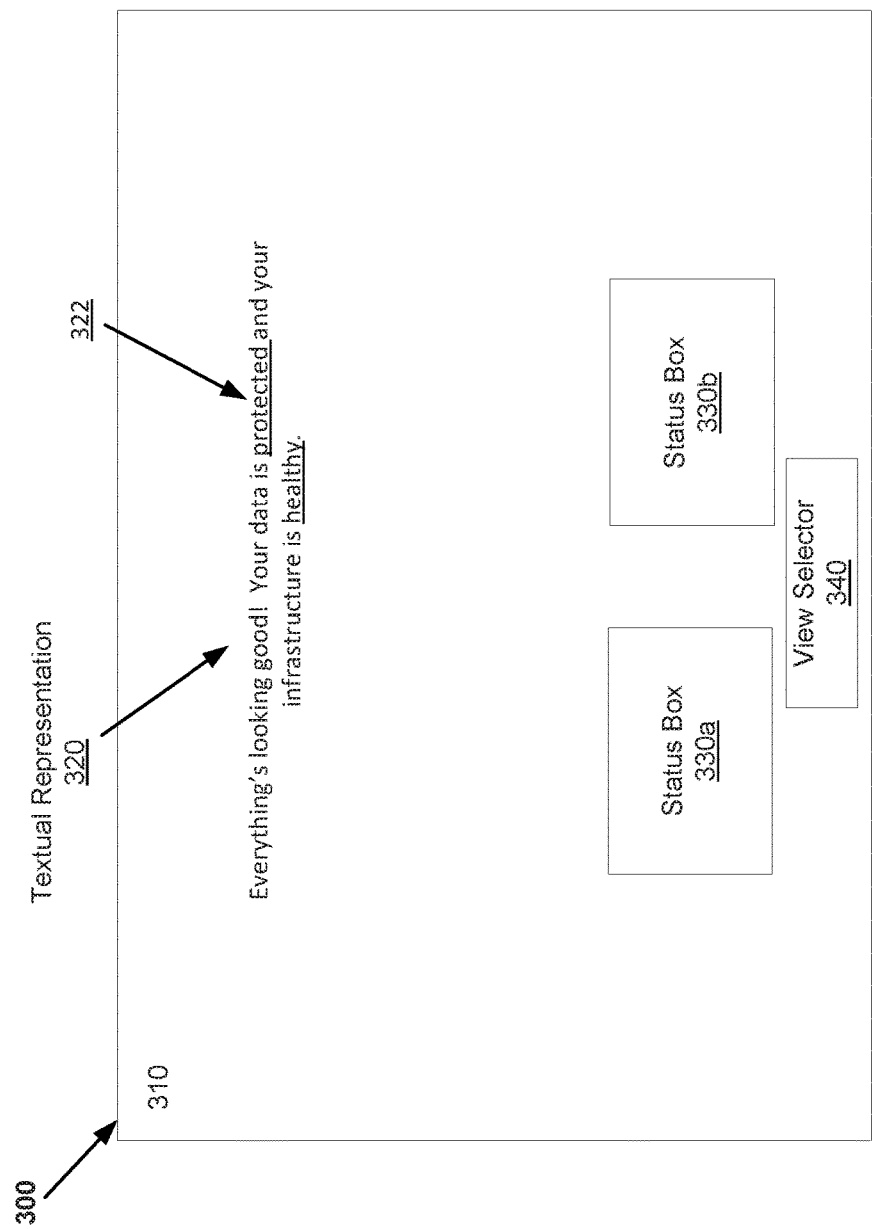
FIG. 3 shows an example first view of a graphical user interface, in accordance with various embodiments.

FIG. 3 shows an example first view 300 of a graphical user interface, in accordance with various embodiments. First view 300, also referred to herein as "Zen mode," provides a simplified and clear overview of the overall health and/or status of the monitored system. In one embodiment, first view 300 includes a meta layer applied over a more detailed view (e.g., second view 400 of FIG. 4A). First view 300 includes textual representation 320, at least one status box 330 (shown as status boxes 330a and 330b), and view selector 340, all placed on background 310. Status boxes represent different metrics related to health and performance of monitored systems.

Textual representation 320 provides information indicative of a status of a monitored system. In one embodiment, textual representation 320 includes a narrative description of the status of the monitored system. In various embodiments, textual representation 320 can include a character string, a word, a phrase, a sentence, a plurality of sentences, a paragraph, etc. In various embodiments, the information presented in textual representation 320 progresses from general to specific. For example, the first sentence of textual representation 320 describes the highest level status ("Everything's looking good!"), and following sentences describe lower levels of detail as deemed appropriate based on the particular status boxes displayed in the first view. In one embodiment, the first sentence of textual representation 320 should communicate to the user whether their VSAN is running or not. Latter sentences should provide the light clarifying details.

In accordance with various embodiments, textual representation 320 includes at least one interactive portion 322 that is user-selectable for presenting underlying information associated with the interactive portion 322. In various embodiments, interactive portion 322 can include a character string, a word, a phrase, a sentence, a plurality of sentences, a paragraph, etc. In various embodiments, interactive portion 322 is a portion of (e.g., not all of) textual representation 320. For example, interactive portion 322 is associated with the information presented within status box 330a. A user interaction with interactive portion 322 may cause status box 330a to be highlighted or emphasized. For example, a user causing a cursor to hover over interactive portion 322 may cause status box 330a to be brought to a foreground, be highlighted, or emphasized in another way indicative of the content of interactive portion 322 being associated with the information within status box 330a. In various embodiments, interactive portion 322 is highlighted within textual representation 320. For example, interactive portion 322 may be presented using a different color, a different font, and/or a different formatting, to indicate its interactivity. For example, the text of interactive portion 322 may be presented in a different color (e.g., white) than the rest of textual representation 320, and may be underlined.

In accordance with various embodiments, an interactive portion(s) of the textual representation are character strings, words or short phrases that most concisely communicate the core status information presented in the textual representation. For instance, the interactive portions may be either the grammatical object(s) of a sentence of the textual representation with accompanying adjectives, or an adjective or verb-adverb pair modifying the subject(s) of the sentence. For example: "X is *running fine*" or "This other system has *higher latency*" or "System Y is *healthy*, and System Z is *slightly abnormal*"." An example of a sentence with multiple highlighted components is "Your system is currently at *X %* capacity and with the current trend, capacity will likely run out in *Y days/hours*."

Status boxes 330a and 330b include information related to the health and/or operation of the monitored system. For example, where the monitored system is a VSAN, status box 330a may include an overall data health metric and status box 330b may include an overall infrastructure health metric. It should be appreciated that first view 300 may include any number of status boxes 330, and that the specific amount illustrated in FIG. 3 is an example. Moreover, it should be appreciated that the number of status boxes 330 included in first view 300 may vary based on the conditions and health of the monitored system.

In accordance with various embodiments, first view 300 operates in two modes, referred to herein as a first mode and a second mode, where the first mode is indicative of the health of the monitored system in a first state and the second mode is indicative of the health of the monitored system in a second state. Generally, the first mode is indicative of the absence of detection of a particular condition and the second mode is indicative of the detection of a particular condition. For example, where the first mode may be indicative of the monitored system being healthy overall and the second mode may be indicative of the monitored system having a detected error or deviation from standard operations.

In various embodiments, the first mode indicates that the monitored system is operating within normal operational parameters. In one embodiment, the background 310 visually depicts the first mode. For example, the background may be a particular color in the first mode (e.g., green), may include a particular pattern, or include other visual indicators illustrating the monitored system in the first mode. For instance, a green background is indicative of normal operation of the monitored system. In various embodiments, while first view 300 is indicative of the monitored system operating in the first mode, status boxes 330a and 330b include information further illustrative of the normal operation of the monitored system.

In various embodiments, the second mode indicates that the monitored system is not operating within normal operational parameters. For example, a monitored metric may indicate that a particular component, parameter or other monitored operation is operating outside of normal parameters (e.g., an error is detected). Examples of errors include a hardware failure, a network communication failure, a data capacity threshold being reached, or any other parameter. It should be appreciated that in various embodiments these parameters and metrics can be designed and generated by a system administrator, and that the different types of metrics monitored will vary based on the type of monitored system.

In one embodiment, the background 310 visually depicts the second mode when the first view is in the second mode. For example, the background may be a particular color in the second mode (e.g., red), may include a particular pattern, or include other visual indicators illustrating the monitored system in the first mode. For instance, a red background is indicative of the detection of a particular operating condition of the monitored system (e.g., an error condition). In various embodiments, while first view 300 is indicative of the monitored system operating in the second mode, status boxes 330a and 330b include information further illustrative of the detected particular condition. For example, when a particular condition is detected, status box 330a includes information pertinent to the detected condition. In one embodiment, the status boxes 330 of first view 300 are updated to include information pertinent to the detected condition. As will be explained below in accordance with FIGS. 4A-D, a second view includes a plurality of status boxes descriptive of various metrics and information. In response to the detection of a particular condition (e.g., a metric associated with a status box of second view 400), the corresponding status box to the second view is promoted to the first view.

Still with reference to FIG. 3, view selector 340 is selectable for switching from first view 300 to a second view (e.g., second view 400 of FIG. 4A).

Figure 4B:
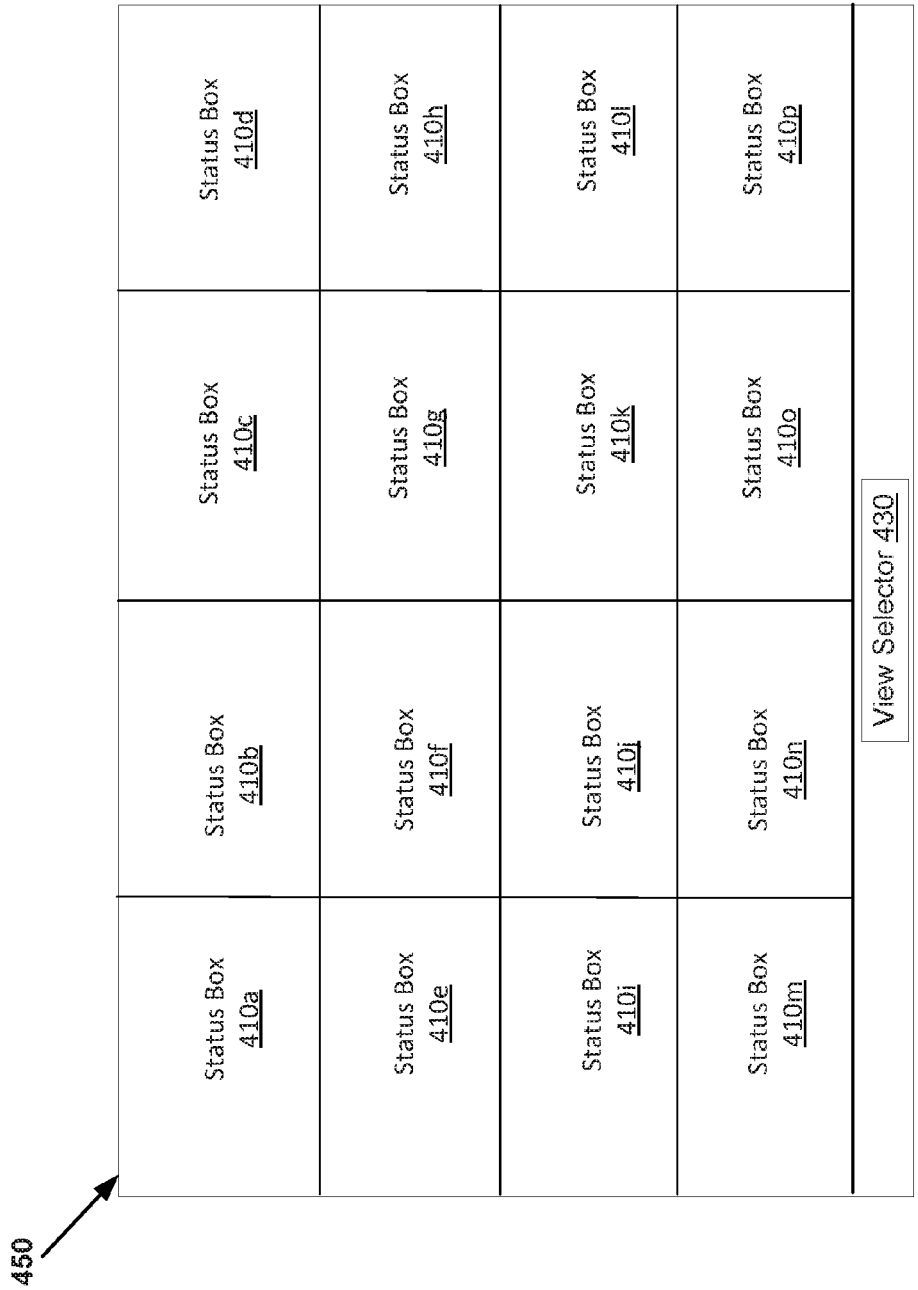

FIGS. 4A-D show example second views of a graphical user interface, in accordance with various embodiments. With reference to FIG. 4A, second view 400 is shown, including status boxes 410a-p, groups headers 420a-d, and view selector 430. Status boxes 410a-p are individually representative of monitored attributes, metrics, and or conditions of the monitored system. As described above, status boxes 410a-p may include information illustrative of any monitored condition, parameters, attribute, metric, etc. of the monitored system. For example, where the monitored system is a VSAN, the information presented in status boxes 410a-p may include information illustrative of VSAN health, capacity, performance, and environment. Example VSAN health information includes, data health, infrastructure health, network health, and IOPS. Example capacity information includes data efficiency, data distribution, and usage predictions. Example performance information includes IOPS, throughput, latency and latency hotspots. Example environment information includes VM overview, host overview, version usage, and enabled features. As shown in FIG. 4A, status boxes 410a-p have uniform dimensions (e.g., they are the same size). However, it should be appreciated that the status boxes may of second view 400 may have different sizes or variable sizes (e.g., depending on the particular condition of the attribute represented by a particular status box).

As shown in FIG. 4A, sixteen status boxes 410a-p are arranged in a four-by-four grid. However, it should be appreciated that second view 400 can include any number of status boxes, and is not limited to the illustrated embodiment. Moreover, it should be appreciated that the status boxes need not be arranged in a symmetric grid. For example, a second view may include twelve status boxes arranged in a three-by-four grid, fifteen status boxes arranged in a five-by-three grid, one-hundred status boxes arranged in a ten-by-ten grid, seventeen status boxes arranged in four rows of five, four, four and four status boxes, thirteen status boxes arranged in four columns of four, three, two and four status boxes, etc.

Optionally, status boxes 410a-p are arranged into groups, wherein group headers 420a-d describe the status boxes within particular groups. As shown in FIG. 4A, group header 420a defines a group including status boxes 410a-d, group header 420b defines a group including status boxes 410e-h, group 420c header defines a group including status boxes 410i-1, and group 420d header defines a group including status boxes 410m-p. It should be appreciated that status boxes included within a particular group may be a design decision, and can be created or updated by an administrator. For example, groups headers 420a-d may define groups including health, capacity, performance and environment, where the status boxes are arranged according to the group with which they are individually associated. As shown in FIG. 4A, groups of status boxes are arranged horizontally in rows. However, it should be appreciated that the groups can be arranged in other ways (e.g., vertically by column, grouped by quadrant, etc.)

During operation, status boxes 410a-p graphically represent information related to the metric the individual status boxes are representing. In one embodiment, a background of a status box of second view 400 has a first color in the absence of the detection of a particular condition. For example, when a status box is indicative of a metric or operation performing normally, the background of the status box is particular color, e.g., black. In one embodiment, a background of a status box of second view 400 has a second color in response to the detection of a particular condition. For example, when a status box is indicative of a metric or operation performing outside of normal bounds (e.g., in an error condition), the background of the status box is particular color, e.g., red. In one embodiment, where a particular status box is indicative of a particular condition, the background of the group header associated with the particular status box is also changed to a particular color. For example, consider status box 410f indicating that the metric represented by status box 410f has entered an error condition. In this example, the background of status box 410f will change from black to red, and the background of group header 420b will also change from black to red.

In various embodiments, a user interaction (e.g., selecting with a cursor) with a status box will provide additional information regarding the particular status box. For example, if a status box indicates that a particular condition has been detected, an administrator might desire additional information. A user selection of a status box may cause another view of the GUI to be presented for displaying detailed information about the data associated with the selected status box. In one embodiment, a control may be provided for allowing the administrator to perform management tasks related to the information presented by the status box. For example, a control may allow an administrator to add disk space or memory, to rebalance components, to provision VMs, or to perform various diagnostics. In other embodiments, a control may allow an administrator to access an external management tool for performing various management operations or tasks.

In other embodiments, a row or column of a second view may include more status boxes that can be shown in a particular display, and provides a user interface mechanism (e.g., a scroll bar, side arrows, or accordion menu) to navigate through all status boxes of a row or column. For example, a hidden status box may indicated detection of an error condition, but would not be visible, and the corresponding group header would provide indication that a status box of the group is in an error condition, thus notifying a user to navigate through the row to the hidden status box.

As described above, in accordance with various embodiments, at least one status box of FIG. 4A is visible in a first view (e.g., first view 300 of FIG. 3). Upon detection of a particular condition, a status box indicative of that condition can be promoted to the first view.

Still with reference to FIG. 4A, view selector 430 is selectable for switching from second view 400 to a first view (e.g., first view 300 of FIG. 3).

With reference to FIG. 4B, second view 450 is shown, including status boxes 410a-p and view selector 430. Second view 400 presents information and operates in a similar fashion as second view 400 of FIG. 4A, with the exception of the absence of group headers. As presented above, group headers are optional, as illustrated in FIG. 4B.

With reference to FIG. 4C, second view 460 is shown, including status boxes 410a-i, group headers 470a-c, and view selector 430. Second view 460 presents information and operates in a similar fashion as second view 400 of FIG. 4A, with the exception of the different number of status boxes (e.g., nine arranged in a three by three grid) and the corresponding different groups represented by group headers 470a-c. FIG. 4C further illustrates that any number of status boxes can be presented in second view 460, and it should be appreciated that any number of status boxes arranged in any fashion may be included in a second view.

With reference to FIG. 4D, second view 480 is shown, including status boxes 410a-o, group headers 490a-d, and view selector 430. Second view 480 presents information and operates in a similar fashion as second view 400 of FIG. 4A, with the exception of the different number of status boxes of various (e.g., non-uniform) sizes, and the corresponding different groups represented by group headers 490a-c. FIG. 4D further illustrates that status boxes need not cover a complete row (or column), as indicated by gap 485.

Figure 5A:
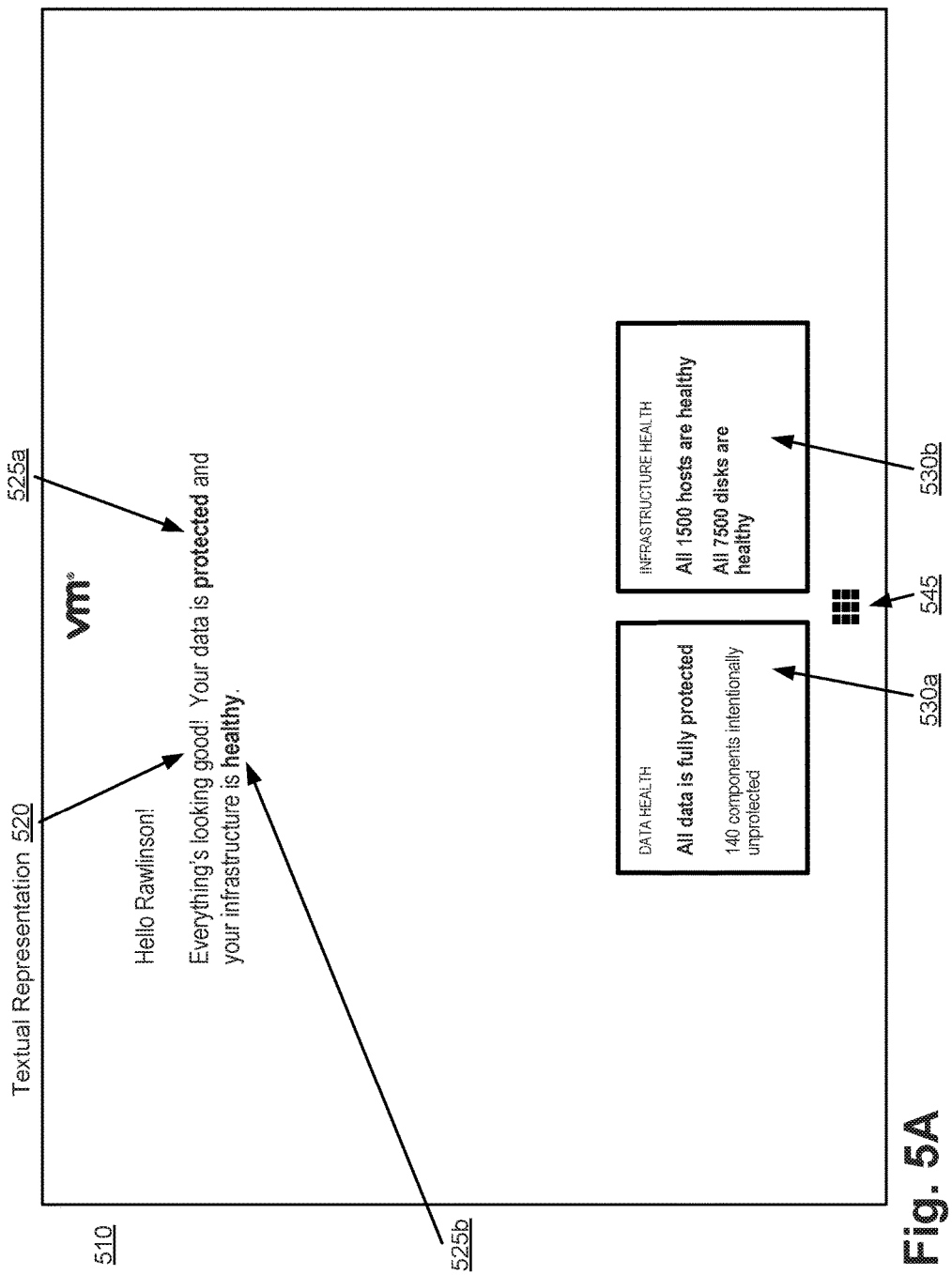
Figure 5C:
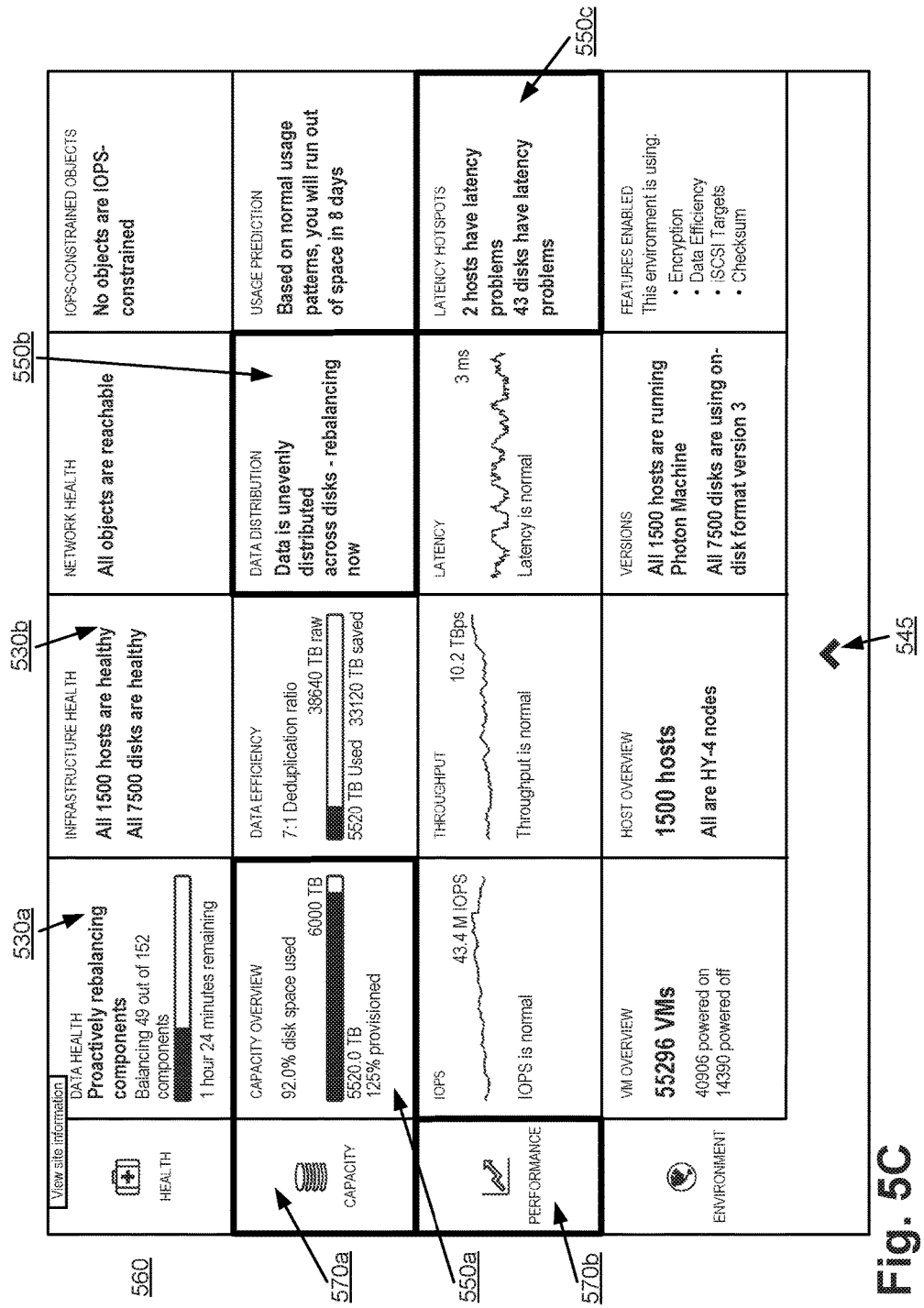

FIGS. 5A-C show an example GUI for a VSAN, in accordance with various embodiments. With reference to FIG. 5A, first view 510a of the GUI is shown, where first view 510a includes textual representation 520, status boxes 530a and 530b, and view selector 540. First view 510a of FIG. 5A shows that the VSAN being monitored is operating within normal operating parameters (e.g., is operating in a first mode). Textual representation 520 includes a narrative description indicating that the VSAN is operating normally (e.g., "Everything's looking good! Your data is protected and your infrastructure is healthy") and the background of first view 510a is in a first color (e.g., green). Textual representation 520 includes interactive portion 525a ("protected") and interactive portion 525b ("healthy"). As shown, interactive portions 525a and 525b are presented using a different color indicating their interactivity.

Interactive portion 525a is associated with status box 530a and interactive portion 525b is associated with status box 530b. In one embodiment, when a user interacts with interactive portion 525a (e.g., hovers a cursor over interactive portion 525a), status box 530a will be emphasized. In one embodiment, when a user interacts with interactive portion 525a (e.g., left-clicks a mouse when a cursor is over interactive portion 525a), details associated with status box 530a (e.g., opens second view 560 of FIG. 5C or opens a detailed view of the information represented by status box 530a). View selector 545 is selectable for switching from first view 510a to second view 560 of FIG. 5C.

First view 510a describes a VSAN operating normally. Textual representation 520 provides a narrative description of the normal operations, and is presented at a high level to give an administrator an overall sense of the performance of the VSAN. The green background also conveys information that the VSAN is operating normally. Status boxes 530a and 530b provide additional support for the narrative description, illustrating that all data is fully protected (status box 530a) and that all hosts and disks are healthy (status box 530b). Moreover, interactive portions 525a and 525b allow an administrator to quickly locate the support for the particular assertions that the data is protected and the infrastructure is healthy.

With reference to FIG. 5B, first view 510b of the GUI is shown, where first view 510b includes textual representation 520, status boxes 530a and 550a-c, and view selector 545. First view 510b of FIG. 5B shows that the VSAN being monitored is not operating within normal design parameters, and that a particular condition has been detected for at least one parameter (e.g., is operating in a second mode). Textual representation 520 includes a narrative description indicating that the VSAN is operating outside of design parameters (e.g., "The cluster is still running fine, but used disk space is at 92% and rising. It looks like the data is unevenly distributed, causing higher latency at some disks" and the background of first view 510b is in a second color (e.g., red). Textual representation 520 includes interactive portion 540a ("running fine"), interactive portion 540b ("92%"), interactive portion 540c ("unevenly distributed") and interactive portion 540d ("higher latency"). As shown, interactive portions 540a-d are presented using a different color, indicating their interactivity.

Interactive portion 540a is associated with status box 530a, interactive portion 540b is associated with status box 550a, interactive portion 540c is associated with status box 550b, and interactive portion 540d is associated with status box 550c. In one embodiment, when a user interacts with interactive portion 540a (e.g., hovers a cursor over interactive portion 540a), status box 530a will be emphasized. In one embodiment, when a user interacts with interactive portion 540a (e.g., left-clicks a mouse when a cursor is over interactive portion 540a), details associated with status box 530a (e.g., opens second view 560 of FIG. 5C or opens a detailed view of the information represented by status box 530a). View selector 540 is selectable for switching from first view 510b to second view 560 of FIG. 5C.

First view 510b describes a VSAN operating outside of design parameters. Textual representation 520 provides a narrative description indicating the overall status of the VSAN, and how performance is being effected. The red background also conveys information to the administrator that the VSAN is not performing as desired, and that action may need to be taken. Status box 530a provides support that the cluster is still performing, but is indicating that components are currently being rebalanced. It should be appreciated that status box 530a is monitoring the same information as in FIG. 5A, but the visualization has changed indicating the rebalancing of components. Status boxes 550a, 550b and 550c illustrate that particular conditions have been detected, causing the VSAN performance to fall outside of design parameters. Status box 550a indicates that a capacity metric has been exceeded, status box 550b indicates that data is unevenly distributed and is currently being rebalanced (as indicated in status box 530a), and status box 550c indicates that some hosts and disks are experiencing latency problems. Interactive portions 540a-d allow an administrator to quickly locate the support for the particular assertions regarding the health of the data and the performance of the VSAN.

With reference to FIG. 5C, second view 560 of the GUI is shown, where second view 560 includes sixteen status boxes, four group headers, and view selector 545. As shown, status boxes 530a, 530b and 550a-c from first views 510a and 510b are included in second view 560. In particular, depending on the health of the VSAN (e.g., whether particular conditions have been detected), particular status boxes are promoted to the first view. When the VSAN was operating normally (e.g., in a first mode), status boxes 530a and 530b were promoted to first view 510a of FIG. 5A. When the VSAN was operating outside of design parameters (e.g., in a second mode), status boxes 550a-550c were promoted to first view 510b of FIG. 5B, and status box 530b was removed from first view 510b (status box 530a remained in first view 510b, but the information presented changed).

It should be appreciated that the status boxes presented in second view 560 (and possibly first views 510a and 510b by selective promotion depending on the detection of particular condition) can include any type of information desired by a VSAN administrator. For example, status boxes can provide health-related information (e.g., data health, infrastructure health, network health, and IOPS-constrained objects, capacity status boxes can provide capacity overview, data efficiency, data distribution and usage prediction, performance status boxes can provide IOPS, throughput, latency, and latency hotspots, and environment status boxes can provide a VM overview, a host overview, versions and features enabled.

As status boxes 550a-c are indicating that a particular condition has been detected (e.g., a data capacity threshold has been exceeded), those status boxes have a different background than the other status boxes. For example, status boxes 550a-c may have a red background while the other status boxes have a black or gray background. This allows for an administrator to quickly navigate to potential trouble spots. Moreover, group headers 570a and 570b, representing groups including status boxes 550a-c, also have a different background (e.g., red) than the other group headers (e.g., black or gray) not associated with status boxes indicating particular conditions.

In various embodiments, a user interaction (e.g., selecting with a cursor) with a status box will provide additional information regarding the particular status box. For example, status box 550a indicates that 92% of the available disk space is used. This particular condition may have been identified once a threshold (e.g., 90% of available disk space) is used. A user selection of status box 550a may cause another view of the GUI to be presented for displaying detailed information about disk usage. In one embodiment, a control may be provided for allowing a user to add additional disk space. In another embodiment, a control may be provided for allowing a user to access a disk management tool to manage the available disk space.

Example Methods of Operation

Figure 6B:
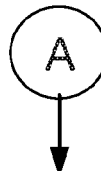
Figure 6C:
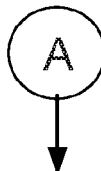

FIGS. 6A-C illustrate a flow diagram 600 of an example method for dynamically presenting status information of a monitored system within a graphical user interface, according to various embodiments. Procedures of this method will be described with reference to elements and/or components of FIGS. 3 and 4A-D. It is appreciated that in some embodiments, the procedures may be performed in a different order than described, that some of the described procedures may not be performed, and/or that one or more additional procedures to those described may be performed. Flow diagram 600 includes some procedures that, in various embodiments, are carried out by one or more processors under the control of computer-readable and computer-executable instructions that are stored on non-transitory computer-readable storage media. It is further appreciated that one or more procedures described in flow diagram 600 may be implemented in hardware, or a combination of hardware with firmware and/or software.

With reference to FIG. 6A, at procedure 610 of flow diagram 600, in various embodiments, a first view (e.g., first view 300) is displayed within a GUI, the first view comprising a textual representation (e.g., textual representation 320) indicative of a status of a monitored system, the textual representation comprising at least one interactive portion (e.g., interactive portion 322) that is user-selectable for presenting underlying information associated with the interactive portion. In one embodiment, the monitored system is a VSAN. In one embodiment, the textual representation comprises a narrative description of the status of the monitored system. In one embodiment, the at least one interactive portion comprises a word. In another embodiment, the at least one interactive portion comprises a character string. In another embodiment, the at least one interactive portion comprises a phrase.

In one embodiment, the first view comprises at least one status box (e.g., status box 330a) in the absence of detection of a particular condition, the at least one status box selected from the plurality of status boxes of the second view, and wherein the textual representation comprises at least one interactive portion related to the at least one status box. In one embodiment, a background (e.g., background 310) of the first view has a first color in the absence of the detection of a particular condition and has a second color in response to the detection of a particular condition.

At procedure 620, responsive to a user selection, a second view (e.g., second view 400) is displayed within the graphical user interface, the second view comprising a plurality of status boxes (e.g., status boxes 410a-p) representative of monitored attributes of the monitored system. In one embodiment, where the monitored system is a VSAN, the plurality of status boxes are representative of monitored attributes of the VSAN.

In one embodiment, as shown at procedure 630, the monitored attributes of the plurality of status boxes are automatically monitored for detection of at least one particular condition.

At procedure 640, a particular status box of the plurality of status boxes is selectively promoted to the first view in response to the detection of a particular condition based on the monitored attributes. In one embodiment, the particular condition is an error condition. In one embodiment, a background of a status box of the second view has a first color in the absence of the detection of a particular condition and has a second color in response to the detection of a particular condition.

At procedure 650, a particular interactive portion associated with the particular status box is integrated into the textual representation.

With reference to FIG. 6B, in one embodiment, at procedure 660, responsive to a user interaction with an interactive portion of the textual representation, at least one status box within the first view associated with the interactive portion is emphasized.

With reference to FIG. 6C, in one embodiment, at procedure 662, responsive to a user interaction with a status box within the first view the second view is displayed. At procedure 664, the status box is emphasized within the second view.

Figure 6D:
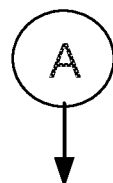

With reference to FIG. 6D, in one embodiment, at procedure 672, responsive to a user interaction with a status box, a detailed view providing additional information related to the selected status box is presented. In one embodiment, the detailed view comprises a control allowing an administrator to perform management tasks related to the information presented by the selected status box.

Conclusion

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the claims.

Reference throughout this document to "one embodiment," "certain embodiments," "an embodiment," "various embodiments," "some embodiments," or similar term means that a particular feature, structure, or characteristic described in connection with the embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A computer-implemented method for dynamically presenting status information of a monitored system within a graphical user interface, the method comprising:
displaying a first view within the graphical user interface, the first view comprising a first graphical element and a textual representation indicative of a status of a monitored system, the textual representation comprising at least one interactive portion that is user-selectable for presenting underlying information associated with the interactive portion;
displaying, responsive to a user selection of the first graphical element, a second view within the graphical user interface, the second view comprising a grid having a plurality of status boxes representative of different monitored attributes of the monitored system;
selectively promoting a particular status box of the plurality of status boxes from the second view to the first view in response to detection of a particular condition based on the monitored attributes; and
integrating a particular interactive portion associated with the particular status box into the textual representation, the particular interactive portion being user-selectable for presenting underlying information associated with the particular interactive portion.

2. The method of claim 1, wherein the textual representation comprises a narrative description of the status of the monitored system.

3. The method of claim 1, wherein the at least one interactive portion comprises a word.

4. The method of claim 1, wherein the at least one interactive portion comprises a phrase.

5. The method of claim 1, further comprising:
automatically monitoring the monitored attributes of the plurality of status boxes for detection of at least one particular condition.

6. The method of claim 1, further comprising:
responsive to a user interaction with an interactive portion of the textual representation, emphasizing at least one status box within the first view associated with the interactive portion.

7. The method of claim 1, further comprising:
responsive to a user interaction with a status box within the first view, displaying the second view; and
emphasizing the status box within the second view.

8. The method of claim 1, wherein the first view comprises at least one status box in an absence of detection of a particular condition, the at least one status box selected from the plurality of status boxes of the second view, and wherein the textual representation comprises at least one interactive portion related to the at least one status box.

9. The method of claim 1, wherein the particular condition is an error condition.

10. The method of claim 1, wherein a background of the first view has a first color in an absence of detection of a particular condition and has a second color in response to detection of a particular condition.

11. The method of claim 1, wherein a background of a status box of the second view has a first color in an absence of detection of a particular condition and has a second color in response to detection of a particular condition.

12. The method of claim 1, wherein the monitored system is a virtual storage area network (VSAN), and wherein the plurality of status boxes are representative of monitored attributes of the VSAN.

13. The method of claim 1, further comprising:
responsive to a user interaction with a status box, presenting a detailed view providing additional information related to the selected status box.

14. The method of claim 13, wherein the detailed view comprises a control allowing an administrator to perform management tasks related to the information presented by the selected status box.

15. In a computer system having a graphical user interface including a display device and a user interface selection device, a method for dynamically presenting status information of a monitored system within a graphical user interface, the method comprising:

providing a graphical user interface comprising:
- first view comprising a first graphical element and a textual representation indicative of a status of a monitored system, the textual representation comprising at least one interactive portion that is user-selectable for presenting underlying information associated with the interactive portion, wherein the textual representation comprises a narrative description of a status of the monitored system, wherein a background of the first view has a first color in an absence of detection of a particular condition and has a second color in response to the detection of a particular condition; and
- a second view within the graphical user interface, the second view being displayed in response to a user selection of the first graphical element and comprising a grid having a plurality of status boxes representative of different monitored attributes of the monitored system;

automatically monitoring the monitored attributes of the plurality of status boxes for detection of at least one particular condition;

selectively promoting a particular status box of the plurality of status boxes from the second view to the first view in response to the detection of a particular condition based on the monitored attributes; and integrating a particular interactive portion associated with the particular status box into the textual representation, the particular interactive portion being user-selectable for presenting underlying information associated with the particular interactive portion;

wherein the first view comprises at least one status box in the absence of detection of a particular condition, the at least one status box selected from the plurality of status boxes of the second view, and wherein the textual representation comprises at least one interactive portion related to the at least one status box.

16. The method of claim 15, further comprising:
responsive to a user interaction with an interactive portion of the textual representation, emphasizing at least one status box within the first view associated with the interactive portion.

17. The method of claim 15, further comprising
responsive to a user interaction with a status box within the first view, displaying the second view; and
emphasizing the status box within the second view.

18. The method of claim 15, wherein the particular condition is an error condition.

19. The method of claim 15, wherein the monitored system is a virtual storage area network (VSAN), and wherein the plurality of status boxes are representative of monitored attributes of the VSAN.

20. A computer system comprising:
a graphical user interface;
a display device;
a user interface selection device; and
one or more processors configured to:
provide a graphical user interface for rendering on the display device, the graphical user interface comprising:
- a first view comprising a first graphical element and a textual representation indicative of a status of a monitored system, the textual representation comprising at least one interactive portion that is user-selectable for presenting underlying information associated with the interactive portion and at least one status box representative of a monitored attribute of a virtual storage area network (VSAN), wherein the textual representation comprises a narrative description of a status of the monitored system, wherein the interactive portion is related to the at least one status box, wherein a background of the first view has a first color in an absence of detection of a particular condition and has a second color in response to the detection of a particular condition; and
- a second view within the graphical user interface, the second view being displayed in response to a user selection of the first graphical element and comprising a grid having a plurality of status boxes representative of different monitored attributes of the VSAN;

automatically monitor the monitored attributes of the plurality of status boxes for detection of at least one particular condition;

selectively promote a particular status box of the plurality of status boxes from the second view to the first view in response to the detection of a particular condition based on the monitored attributes; and integrate a particular interactive portion associated with the particular status box into the textual representation, the particular interactive portion being user-selectable for presenting underlying information associated with the particular interactive portion.

* * * * *